Oct. 2, 1951 — V. S. GAPINSKI — 2,569,886
DEVICE FOR DECORATING CAKES
Filed June 4, 1947 — 2 Sheets-Sheet 1

Inventor
Victor S. Gapinski

Oct. 2, 1951 V. S. GAPINSKI 2,569,886
DEVICE FOR DECORATING CAKES
Filed June 4, 1947 2 Sheets-Sheet 2
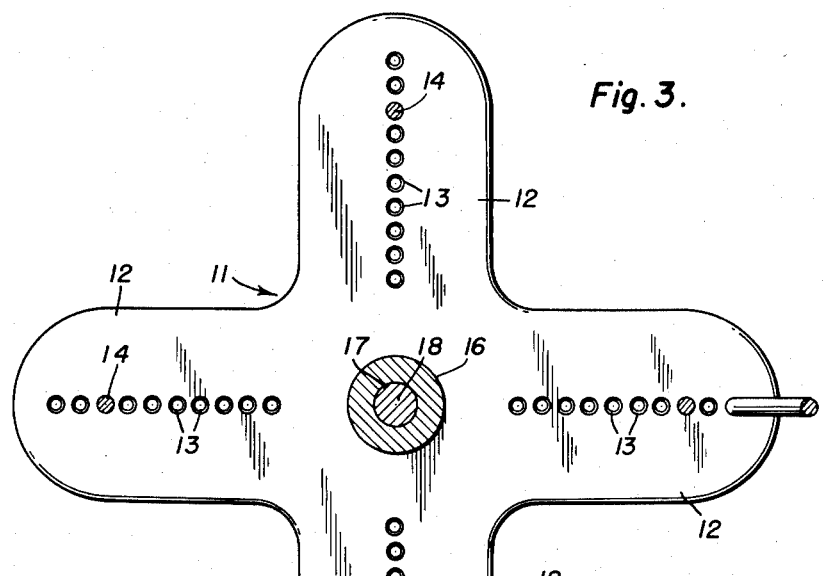
Fig. 3.
Fig. 5.
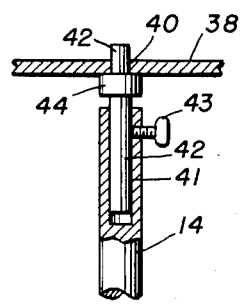
Fig. 4.
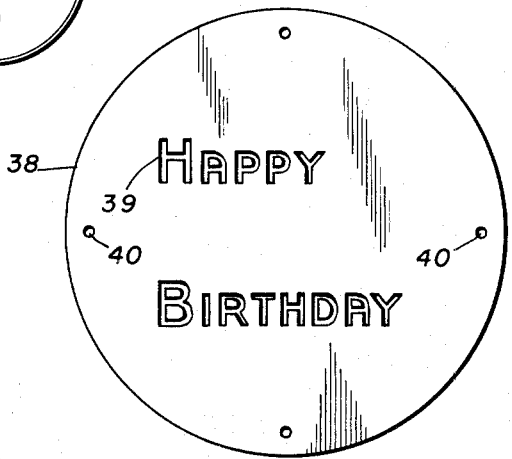
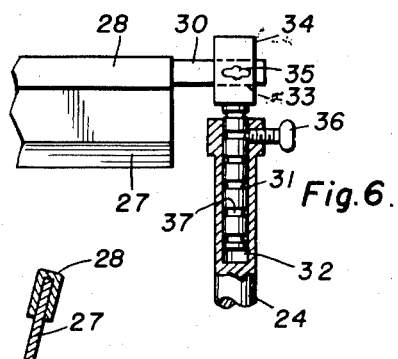
Fig. 6.
Fig. 7.
Inventor
Victor S. Gapinski
By Clarence A. O'Brien
and Harvey B. Jacobson
Attorneys Patented Oct. 2, 1951

2,569,886

UNITED STATES PATENT OFFICE 2,569,886

DEVICE FOR DECORATING CAKES

Victor S. Gapinski, Buffalo, N. Y.

Application June 4, 1947, Serial No. 752,528

7 Claims. (Cl. 101—114)

This invention relates to a device for decorating cakes, and for spreading icing on the top of uniced cakes uniformly, so as to save time and material and facilitate the icing and decorating of cakes including greetings thereon for special occasions.

It is an object of the invention to provide a novel and simple device for spreading icing on the top of cakes and for decorating the same in various colors and with greetings and for adjusting the same to accommodate cakes of different sizes and heights, including the diameter thereof, and to hold the cakes firmly while they are being covered on the top with icing and decorated, using stencils with various designs according to the occasion, thereby saving both time and labor in the hand decorating and icing of cakes.

Another object of the invention is to provide novel and simple means for supporting cakes for icing and decorating, which can be adjusted according to the size and diameter of the cake, and the thickness or height thereof with special reference to the decorating thereof, and for spreading the icing on the top of cakes and to keep the cakes from turning as well as to prevent a stencil plate used for decorating, from moving or sliding as well as for movably supporting a spreading blade for spreading on the icing, the parts being capable of convenient or quick assembly and mounting to accommodate different size cakes and also capable of economical manufacture while efficiently serving its purposes.

Other objects and advantages reside in the details of construction and operation as more fully hereinafter described and claimed, reference being had to the accompanying drawings forming part hereof, wherein like numerals refer to like parts throughout, and in which:

Figure 3 is a horizontal sectional view taken on the line 3—3 of Figure 1;

Figure 4 is a top plan view of a stencil for decorating purposes;

Figure 5 is an enlarged fragmentary detail sectional elevational view showing the manner of supporting the decorating stencils;

Figure 6 is a detail sectional elevation showing the manner of supporting the spreading blade for adjustment, and;

Figure 7 is an enlarged sectional view taken on the line 7—7 of Figure 1.

Figure 1:
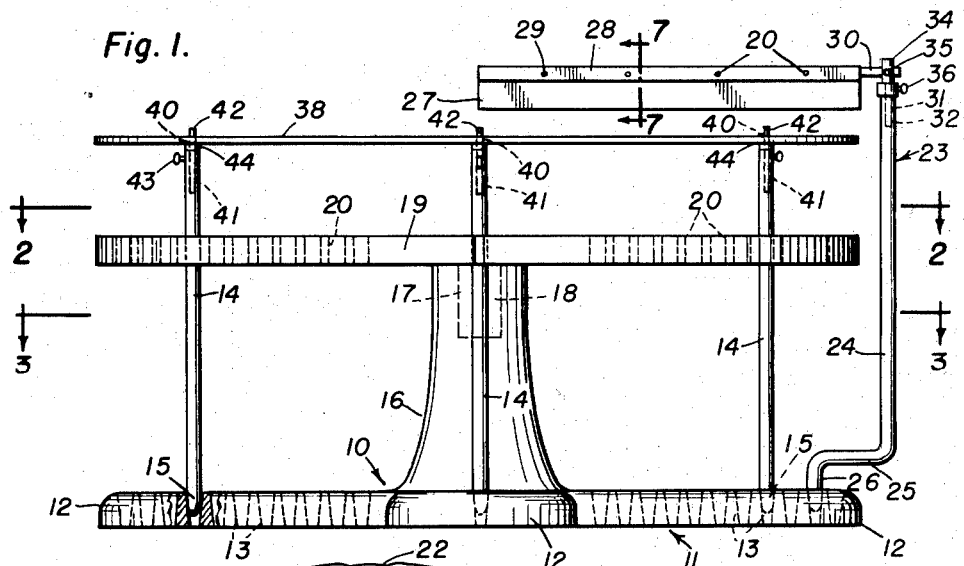
Figure 1 is a side elevation partly in section of a device for decorating cakes in accordance with the invention with a cake support and icing spreader as well as the stencils for decorating all in position.

Referring to the drawings in detail, in which like reference characters designate corresponding parts throughout the several views, the improved device for decorating cakes includes a cake stand and stenciler as well as a spreader, the stenciler serving to simplify the decorating of cakes together with greetings thereon and the spreader for spreading icing on the top of an uniced cake to save time and labor, and which can be easily operated, even by an inexperienced person. It comprises a stand 10 having a base 11 in the form of a cross having a plurality, preferably four equally spaced radiating legs 12 shown or ranged 90 degrees apart and provided with a plurality of centrally positioned and radially aligned tapered vertical holes 13 in each leg or arm 12 forming sockets for a plurality of vertical posts or uprights 14 having rounded tapered or bullet shaped lower ends 15 designed to engage the holes or sockets 13 and adjustable along said arms or legs, according to the size or diameter of the cake to be iced and decorated. The stand 10 is provided with a central upright cone or axial post 16 tapered as shown toward its upper end in frusto-conical formation and provided with an axial or central bearing socket 17 in the upper end thereof in the form of a counter bore, designed to receive the depending central pintle 18 of a cake-supporting disc or plate 19 therein for rotation if desired. The plate or disc 19 which is shown of circular form, is provided with an equal number of holes 20, formed as recesses on opposite sides of radial slots 21 as positioned over the rows of holes 13 in the radiating arms or legs of the base 11, thus producing a disc or plate 19 which is substantially clover shaped. The upright posts or pillars 14, are designed to enter and snugly fit in the holes 20 or recesses forming the same at opposite sides of the radial slots 21, and may be entered through enlarged mouth portions 22 at the outer ends of the slots 21 and the peripheral edge of the plate or disc 19, so as to permit entry radially or insertion from top to bottom and to prevent any wobble or play of the pillars or posts 14 while supporting a cake on the plate 19 or a decorating stencil as will be later described. In this way, cakes of various sizes may be supported on the plate or disc 19 and held in place for icing and decorating by placing the four pillars or posts 14 in an upright position to hold the cake in place, and when desired, to keep the disc 19 and the cake from turning. Obviously, when the upright posts or pillars 14 are raised or removed, the plate or disc 19 may be turned on the central bearing provided by the counter-bored socket 17 and the pintle 18 rotatable therein. However, when using the pillars or posts 14, the cake woll be held therebetween against shifting or sliding and may be effectively iced or decorated on top.

For the purpose of facilitating the icing of cakes and the distribution evenly of the icing thereon, an icing spreader generally indicated at 23 is employed consisting of a curved or crank-shaped bar 24 rectilinear throughout a greater portion of its length, and having a crank portion 25 at its lower end extending perpendicularly to the bar 24 and a depending part 26 extending in the direction of the length of the bar 24 and parallel thereto from the end of the part or arm 25 so as to engage any outer one of the holes or sockets 13 in the base 11. The bar 24 extends considerably above the upright or vertical pillars or posts 14 and the plate or disc 19 and is provided at its upper end with a radially extending spreader member or blade 27 held in a U-shaped binding 28 at the top edge thereof and suitably secured in position by welding, soldering, riveting or otherwise as indicated at 29 between the two sides or folds thereof, said binding through the intermediary of a reinforcing arm 30 if desired projecting from one end of the blade 27 and having a pivot pin 31 extending at right angles thereto for engagement in a central socket 32 longitudinally of the upper end of the bar 24. For this purpose, the arm 30 may engage a diametrical horizontal socket 33 in a head 34 forming an enlargement at the upper end of the pin 31 so as to extend into the socket 32 and held radially adjusted by means of a set screw 35 or turned at any angle, to give an inclination in either direction to the spreader blade 27 with reference to the top of the cake and the icing to be spread thereon. Also, the pin 31 may be vertically adjusted for raising and lowering the spreader blade, as by means of a set screw 36 disposed through the upper socket 32 of the bar 24, and disposed to engage in any one of a plurality of notches 37 provided around the periphery of the pin 31 constituting an extension for the bar 24. In this way, the spreader blade may be accurately adjusted with reference to the thickness of the icing to be spread over the top of the cake supported upon the disc or plate 19. Also, the spreader blade is preferably sloped in the direction in which the cake is turned with reference to the blade.

Figure 2:
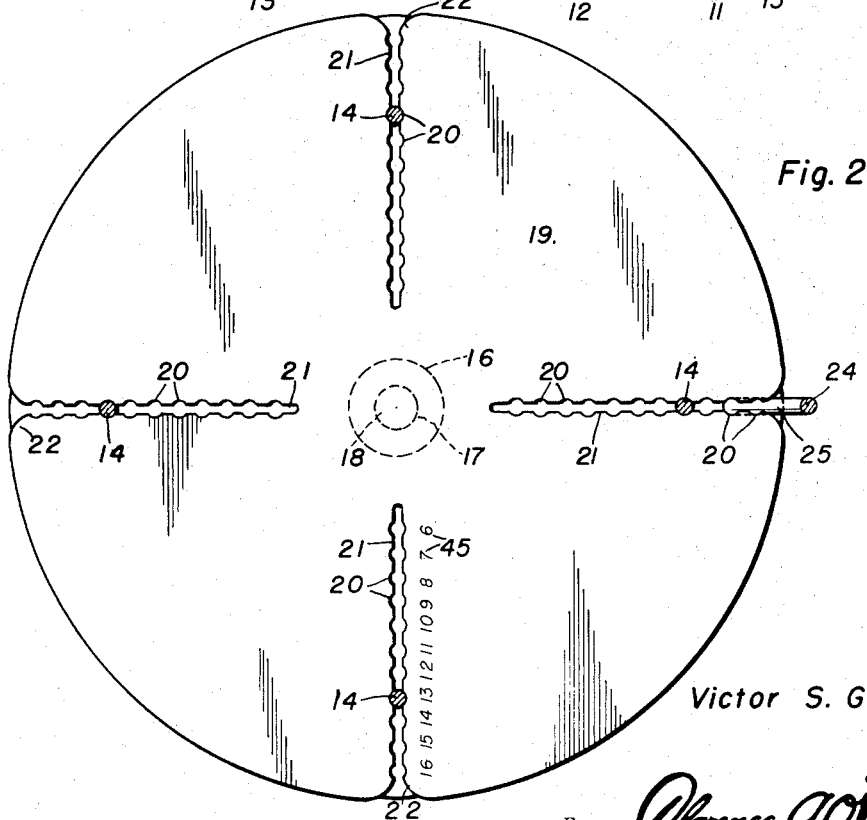
Figure 2 is a horizontal sectional view taken on the line 2—2 of Figure 1.

In order to decorate the cakes with verses and designs, for different occasions, such as holidays, birthdays, anniversaries, etc., the upright pillars or posts 14 are designed to support a stencil plate 38, any number of which may be provided with four equi-distantly spaced holes 40 for use in mounting the stencils. The stencils are in the form of circular plates or discs of thin material, and the pillars or posts 14 are provided with sockets 41 centrally in their upper ends to receive telescopic extensions 42 therein which may be held in vertically adjusted positions by set screws 43 engaged through the walls of the sockets, while the upper ends of the extensions or pins 42 are provided with enlargements 44 spaced from their upper ends, to engage the bottom of the stencil plates or discs 38 after extending said upper ends through the openings 40. These stencil plates will be stamped in various different sizes and designs, with various figures, flowers and verses, according to the occasion, so that they may be used for decorating cakes, according to the taste of the customer. Also, the adjustment of the extensions or pins 42, will depend upon the thickness or height of the cake as supported upon the disc or plate 19, and the space required between said plate or disc 19 and the stencil plate or disc 38, in order that the stencil will rest upon the top of the cake or in close proximity to the top surface thereof, for the purpose of decorating the same in the manner described. As will be seen from Figure 2 of the drawings, the proper spacing for the posts 14 and the proper size for the plate 38 may be determined by marking the holes 20 in the plate 19 with the numbers 45 designating cakes from six to sixteen inches in size or diameter, all of the posts or uprights 14 being set in the corresponding holes of the plate 19, and the stencil plate used being of the required size or diameter. These holes, may be 10 or 11 in number and preferably one-half inch apart or otherwise as desired. In this way, the upright pillars or posts may be lowered to engage them in the holes of the base and thereby prevent the disc 19 and stencil plate or disc 38 from turning or spinning while the cake is being stenciled or decorated. Of course, the openings in the disc or plate 19 will be in line with those of the legs or arms of the base and as much as a four inch adjustment may be provided for the etxensions or pins 42 which support the stencil. When producing the designs and lettering of verses on the cake, which may be previously iced, the icing is placed on the stencil plate and is then spread thereon, so as to be forced through the cut outs thereof onto the cake, by means of the spreader blade or other suitable instrument. Obviously, when the pillars or posts 14 are removed or raised to disengage them from the base, the disc 19 will spin freely so as to be turned for the purpose of spreading icing on the top of a cake. Also, the spreader may be raised or lowered as desired, the blade being set at the desired angle to give an even, smooth spread of icing as the discs is being turned, and being especially used for spreading icing smoothly on the top of the cake before the same is stenciled. Thus, it will be seen that I have provided a very simple device for icing various sizes of cakes with ease and speed and for providing cakes with stencil designs, verses and the like, for any occasion, such as holidays, birthdays, anniversaries, and the like, which device will save considerable time and labor in such work.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what I claim as new is:

1. A device for decorating cakes, comprising a base, a cake-supporting disc rotatably mounted on the base in spaced relation thereto, said base and disc having a plurality of radial rows of openings therethrough, pillars engageable in any selected openings of the base and extended through selected openings of the disc, and a stencil supported on the upper end of said pillars.

2. A device for decorating cakes, comprising a base, a cake-supporting disc rotatably mounted on the base in spaced relation thereto, said base and disc having a plurality of radial rows of openings therethrough, pillars removably engageable in any selected openings of the base and extended through selected openings of the disc, an icing spreader comprising a crank bar detachably engageable in an opening in the base and extended outwardly of the edge of the disc and above the same, and a spreader blade extending radially inwardly from said bar at its upper end.

3. A device for decorating cakes, comprising a base, a cake-supporting disc rotatably mounted on the base in spaced relation thereto, said base and disc having a plurality of radial rows of openings therethrough, and pillars removably engageable in any selected openings of the base and extended through selected openings of the disc.

4. A device for decorating cakes including a base having a central vertical bearing post, a cake-supporting disc rotatably mounted on said post, said disc and base having a plurality of radial rows of openings therethrough, uprights designed to engage in selected openings of the base at their lower ends and extended through selected openings of the disc to points above the latter, said uprights having reduced upper ends, and stencils having cut outs for decorating the cakes, mounted on said reduced ends in spaced relation above the disc to receive icing thereon to be spread and forced through the stencil onto the top of an iced cake supported on the disc.

5. A device for decorating cakes including a base having a central vertical bearing post, a cake-supporting disc rotatably mounted on said post, said disc and plate having a plurality of radial rows of openings therethrough, uprights designed to engage in selected openings of the base at their lower ends and extended through selected openings of the disc to points above the latter, vertically adjustable shouldered extensions on the upper ends of said uprights, and stencils having designs cut therethrough and provided with openings to receive the upper ends of said extensions to support the stencil in spaced relation above the disc.

6. A device for decorating cakes comprising a base having an upright center post, a cake-supporting disc having a center stud rotatably mounted in said post, uprights disposed in uniformly spaced relation about said post and extending upwardly through and above the disc to hold a cake on said disc and engageable with the base to hold the disc from turning, and a spreader mounted on the base and extending inwardly over the disc in spaced relation above the same, for spreading icing over the cake.

7. A device for decorating cakes comprising a base having an upright center post, a cake-supporting disc having a center stud rotatably mounted in said post, uprights extending upwardly through the disc to hold a cake on said disc and engageable with the base to hold the disc from turning, the upper ends of the uprights having pins provided with shoulders, and a stencil plate having decorating openings and provided with holes to receive said pins for support of the stencil plate upon the shoulders in spaced relation above the disc, said stencil plate being adapted to have icing spread thereon for forcing the icing through the decorating openings onto icing on the top of a cake supported on the disc for decorating the same, said pins being vertically adjustable relative to the uprights.

VICTOR S. GAPINSKI.

REFERENCES CITED

The following references are of record in the file of this patent:

UNITED STATES PATENTS

| Number | Name | Date |
| --- | --- | --- |
| 1,472,022 | Cockbill et al. | Oct. 23, 1923 |
| 1,753,549 | Cates | Apr. 8, 1930 |
| 1,781,209 | Barbera | Nov. 11, 1930 |

FOREIGN PATENTS

| Number | Country | Date |
| --- | --- | --- |
| 198,961 | Great Britain | June 14, 1923 |